May 31, 1966   R. W. TODD   3,254,175
MAGNETIC PROXIMITY SWITCH
Filed March 13, 1964   2 Sheets-Sheet 1
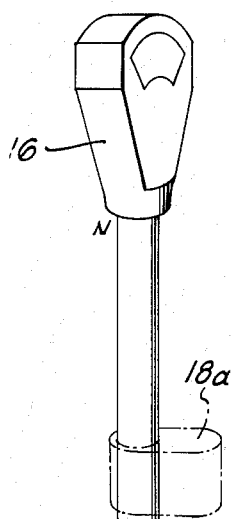
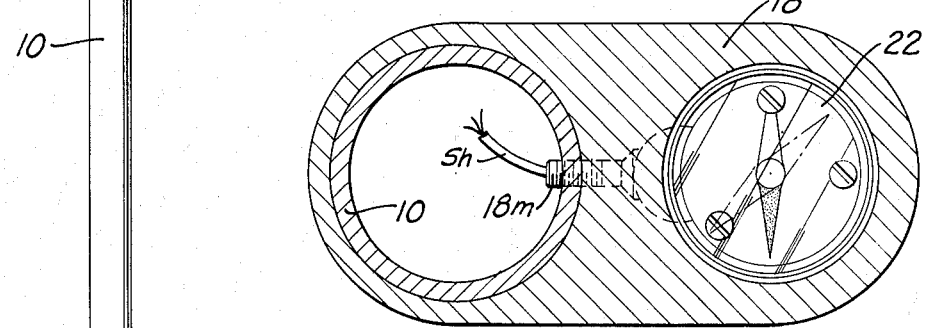
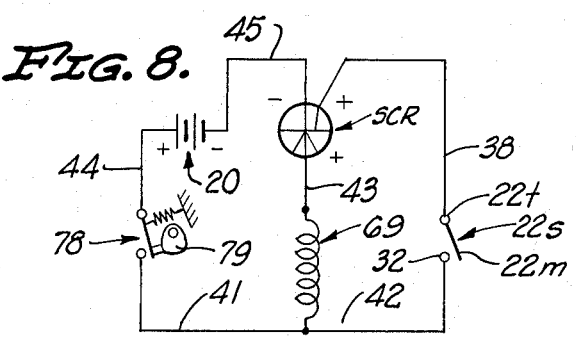
INVENTOR.
RICHARD W. TODD
BY

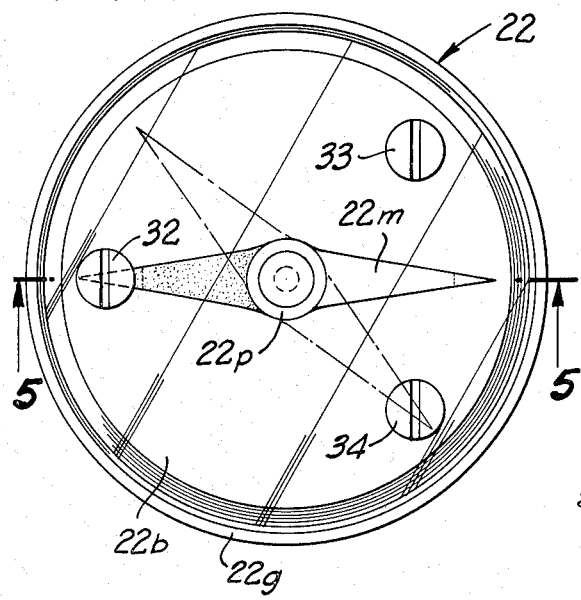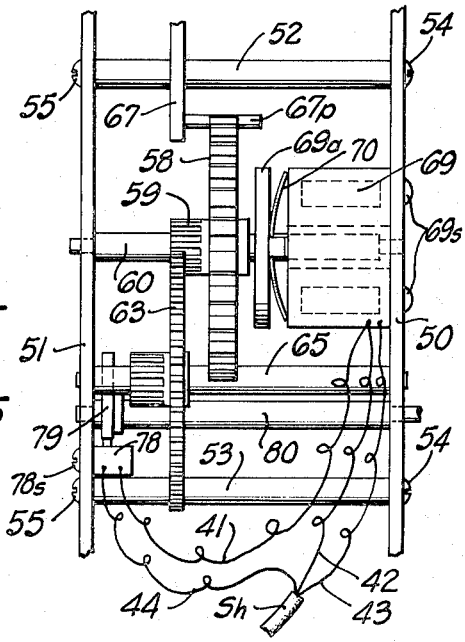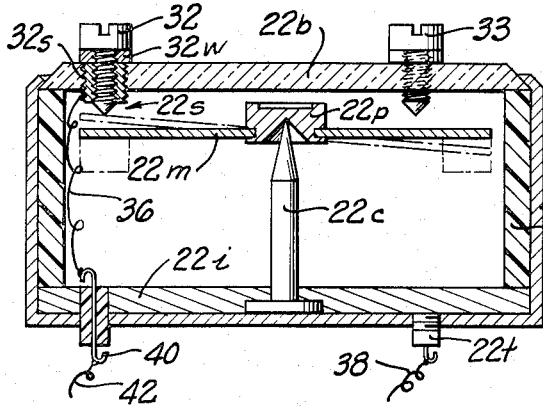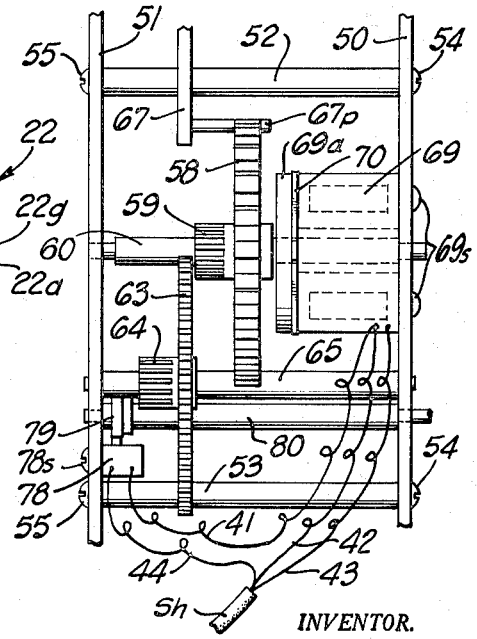

United States Patent Office 3,254,175
Patented May 31, 1966

3,254,175
MAGNETIC PROXIMITY SWITCH
Richard W. Todd, San Jacinto, Calif., assignor, by direct and mesne assignments, to P.A.C.T. Electronics, San Bernardino, Calif., a limited partnership
Filed Mar. 13, 1964, Ser. No. 351,631
4 Claims. (Cl. 200—87)

The invention herein disclosed pertains to parking meters of the type commonly installed at or near a street curb and employed for purposes including derivation of revenue from use of vehicle parking space adjacent the curb. More particularly the invention relates to a parking meter system including a meter and simple automatically acting means for resetting the parking meter to initial or "zero" condition upon departure of a vehicle from the parking space.

The general characteristics of parking meters are well and widely known and a detailed description thereof is not here necessary. It is sufficient for the purposes of this disclosure to note that meters of the principal type here of interest comprise means such as a train of gears or clockwork brought into action by a coin-operated mechanism or by manual or other means which sets or winds or tensions a clock spring and concurrently moves an indicator or flag to a position indicating commencement of a period of time to be measured or demarked by the meter and representing, generally, the value of a coin inserted into the meter. The clockwork comprises an escapement at the high-speed end of the gear train, which escapement demarks and counts off small intervals of time, for example, seconds, until the initially registered and paid-for period has been measured and has elapsed. During elapse of the period of activity of the escapement the indicator has been slowly returned or reset to the "zero" position. Other subsidiary types of meters of interest include comparable setting, timing and indicating means.

Commonly, upon departure of a vehicle from a parking space prior to elapse of the entire period for which payment has been made, another vehicle may be parked in the vacated space and advantage taken of the unexpired portion of the period previously registered. As a consequence some loss of revenue from the meter is experienced.

While some systems and devices for automatically resetting a parking meter incident to departure of a vehicle from the parking space have been proposed, none has gone into extensive use, principally because of the great expense of installation and/or maintenance, or because of complexity, or other like reasons.

The presently disclosed invention provides very simple and inexpensive means utilizing the magnetic field of the earth, and the distortion of that field by presence of a vehicle in a parking space, for controlling action of inexpensive and easily installed means effective to initiate operation of simple meter-resetting means incident to departure of the vehicle from the space. A proximity detector, which may be in the form of a magnetic-field-sensitive switch, and which is preferably of the nature of a modified pocket compass having a rotatable and tiltable needle and operated by changes in the strength and direction of the magnetic field of the earth in the vicinity of the meter incident to arrival at and departure from the vicinity of a motor vehicle, operates to effect switching functions in a control circuit that is energized when the meter is set into operation. An exemplary circuit according to the invention comprises a suitable source of electrical power, the noted switch, preferably also an auxiliary or second switch, an energizable means such as an electromagnet or equivalent device, and preferably also other simple means including a solid-state relay means such as a silicon controlled rectifier (SCR). The arrangement preferably but not necessarily is such that in the absence of the field-disturbing influence of a vehicle in the parking space, the detector switch assumes a circuit-closing attitude or position, whereby, if the meter is set, i.e., registers unused time, an extremely small triggering current flows through the proximity detector switch, whereupon the solid-state device conducts and initiates energization of the energizable means (electromagnet or equivalent device) that is connected with the SCR and power supply, to initiate resetting of the meter to zero. The latter action may readily be accomplished by withdrawal or disengagement of one or more active elements from the clockwork gear train, or otherwise rendering the escapement ineffective, to permit rapid return of the indicator to zero. Preferably, also, upon completion of the resetting action, the clockwork mechanism opens the second switch in the circuit, thereby permitting the electromagnet to become de-energized and the clockwork element or elements to return to operating position, and leaving the power supply open-circuited to save power. Also the arrangement is such that upon entry of a vehicle into the parking space, the consequent distortion of the earth's magnetic field thereadjacent causes the detector or field-sensitive switch to move to open-circuit position and thereby disable the resetting device, whereupon the meter mechanism may be operated (by coin, or manually, following unlocking by coin-insertion) to set the indicator and wind the clockwork for display and operation during a predetermined period of time. As the indicator is moved from zero to a position indicating time, the second switch is closed incident to setting of the meter. Hence, if after the meter has been thus put into operation, the vehicle remains in the parking space for the entire duration of the predetermined period, the field-sensitive switch remains in open-circuit position and the flag or indicator is slowly returned or reset to the "zero" position by operation of the clockwork under the control of the escapement mechanism. If, however, the vehicle is removed from the parking space prior to expiration of the paid-for period of time, the return of the earth's magnetic field to normal configuration in the vicinity of the parking space and meter causes the field-sensitive switch to move to circuit-closing position, with the consequent energization of the magnet and removal of one or more elements from active position in the clockwork gear train, permitting the clockwork to unwind and rapidly reset the meter without the retarding influence of the escapement. The circuit elements are so chosen that the electric currents are of extremely small magnitude, and thus the relatively delicate contact that is preferably effected at the field-sensitive switch is adequate, "burning" or fusing of the contacts is obviated, and only a very inexpensive source of electric power is required. Thus only simple and inexpensive components, all of which may be installed on and in existing meters without disturbing the paving or roadway, are all that are required according to the invention. Further, only very simple additions to or alterations within the meter proper, as by addition of a switch and cam, a spring-return magnet or solenoid, and use of an axially movable element in the gear train, are necessary, the remainder of the necessary apparatus being adapted for attachment to or support by the meter stand or post, or for disposal in the head of the meter. More detailed description and explanation of a preferred physical embodiment of the invention are hereinafter set out.

It is, accordingly, a principal object of my invention to provide a simple and inexpensive parking meter system having means for automatically resetting a parking meter incident to departure of a vehicle from the adjacent parking area or space prior to expiration of the registered time.

Another object of the invention is to provide inexpensive improvements for a parking meter.

Another object of the invention is to provide an automatically-acting parking meter system including a resetting means which uses a minimum of power for its operation.

An additional object of the invention is to provide an inexpensive but effective proximity detector having a switch device operable by changes in the earth's magnetic field in response to arrival and/or departure of a vehicle from a particular area.

Other objects and advantages of the invention are hereinafter made evident in the following descriptive text or set out in the appended claims.

A preferred exemplary physical embodiment of the invention is comprised in the parking meter structure or system illustrated in the accompanying drawings, in which drawings:

FIGURE 1 is a partly diagrammatic representation of a parking meter, meter stand, and a preferred exemplary form of attachment comprised in apparatus conforming to the invention, drawn to a reduced scale and depicted near a curb that defines one boundary of a next-adjacent parking space;

FIGURE 2 is a partially diagrammatic vertical sectional view of a fragmentary part of the structure depicted in FIGURE 1, illustrating the arrangement of some principal components of a preferred exemplary embodiment and arrangement of apparatus components, according to the invention;

FIGURE 3 is a transverse sectional view depicting apparatus components depicted in FIGURE 2, taken on a plane and in the direction indicated by broken line 3—3 in FIGURE 2;

FIGURE 4 is a plan view of a magnetic-field-sensitive switch device or proximity detector device comprised in components depicted in FIGURE 2, magnified in the interest of clarity;

FIGURE 5 is a vertical sectional view taken on a plane and in the direction indicated by broken line 5—5 of FIGURE 4;

FIGURE 6 is an enlarged fragmentary vertical sectional view portions of the clockwork of the parking meter depicted in FIGURE 1, with parts modified and added in accord with the principles of the present invention and with parts in normal positions;

FIGURE 7 is a view similar to FIGURE 6, but depicting certain parts in releasing position with an electromagnet energized; and FIGURE 8 is a circuit diagram illustrating electrical connections of components, according to the invention.

In the drawings there is illustrated a preferred exemplary physical embodiment of the invention. It will be understood that modifications of the exemplary construction and arrangement are contemplated to be encompassed within the scope of the invention, limited only as defined by the appended claims. Referring first to FIGURE 1, a parking meter stand 10 is upstanding from a pavement 12 or the like, adjacent a curb 14, and the stand supports a parking meter 16 that is capable of being set to indicate and measure a period of time and capable of resetting itself slowly incident to passage of the indicated period of time. Except as hereinafter noted, the aforementioned structures and devices are or may be of any suitable kind and are not, per se, of the invention, and may be like or similar to stands and/or meters illustrated in U.S. Patents 2,223,843 and 2,945,341, the disclosures of which are incorporated herein by reference. Stand 10 may be in the form of a pipe or tube the lower end of which is embedded in pavement 12 or otherwise supported in a substantially fixed location relative to curb 14 and a vehicle parking space 17 thereadjacent. If not tubular, the stand is provided with an internal passage for a purpose presently made evident. However, substantially all such meter stands are made of two-inch pipe. Meter 16 is of the aforementioned type utilizing a clockwork gear train and having an interior space adjacent the gear train for components provided according to the invention and presently to be described.

Affixed to stand 10 at a selected location thereon and in a predetermined attitude relative to the mentioned parking space and relative to the direction of the earth's magnetic field thereadjacent, is a nonmagnetic enclosure or housing 18. As is indicated by dotted outline at 18a, housing 18 may be positioned along the vertical exposed length of stand 10, and may be disposed in various directions relative to curb 14, e.g., extending toward, parallel to, or extending away from, the curb. As is indicated in FIGURES 2 and 3, the housing 18 is preferably formed as an integral member in the form of a molded or cast part. The housing is provided with a vertical throughbore or hole 18h that is of dimension such that the housing may be readily installed with a close fit on the stand 10; and in the outstanding portion of the housing there is provided an interior chamber 18c that is open to the exterior at the bottom 18b of the housing. Chamber 18c is of configuration such as to safely house a power supply 20 and a proximity detector 22 as indicated in FIGURE 2. Power supply 20 may conveniently be a mercury-cell or like battery having long-life characteristics, and may be supported in the housing by any suitable means such as a strong disc or plate 24 that is held up against an annular shoulder 18s formed in the lower wall 18w of the chamber, by means of an internal lock ring 26 that is seated in a complementary groove machined in the chamber wall below shoulder 18s, as indicated.

The proximity detector 22 is similarly supported in the chamber 18c, above the power supply, preferably by removable means such as a lock ring 28 that is seated in an annular groove machined in the upper part of the wall of the chamber as indicated. The detector 22 may be cushioned against and by a pad of foamed resin, 23, disposed thereabove in chamber 18c. Preferably and as shown, the power supply and the proximity detector are of cylindrical form whereby they may be snugly and conveniently supported by the simple housing and appurtenant means shown. As is evident, the housing thus securely protects the power supply and the proximity detector and gives no indication of the presence therein of those components. The housing is adapted to be supported by and firmly but invisibly secured in adjusted position to stand 10 by a machine screw 18m that is seated in a countersunk hole 18n provided through the wall separating chamber 18c and bore 18h. Screw 18m is drawn up tight in a complementary tapped hole provided at a preselected location in the wall of stand 10, as indicated, and thus firmly anchors housing 18 to stand 10 in an unobvious manner. If desired, more than one such screw may be employed, in an evident modification. Proximity detector 22 (FIGURES 4 and 5) is of the form of a modified magnetic compass, and comprises a magnetically polarized conductive blade or "needle" 22m that is attached to a hard conductive nonmagnetic bearing 22p that in turn is supported by a nonmagnetic but conductive pivot or pin 22c for both rotation and limited tilting movement. Pin 22c is conductively affixed in upright attitude on the center of the floor of a nonmagnetic conductive case 22g of cup-like form, as by means of solder. A cover 22b, preferably formed of transparent insulative material, such as polymerized methyl methacrylate, is suitably secured to case 22g as by spinning the upper edge of the case over the beveled edge of the cover as shown, the cover being supported on an insulative liner or ring 22a that is fitted in the case and rests on an insulation base 22i that in turn is seated on the bottom of the case. Secured in respective spaced-apart tapped holes in cover 22b as indicated, is a stationary nonmagnetic but conductive contact device comprising a conductive tapped and threaded sleeve 32s and a screw contact 32 of brass or the like, and first and second other nonmagnetic screws 33 and 34 that are respectively spaced approximately 135° from contact 32 as measured around pivot 22c. An insulated conductor 36 (FIGURE 5) is connected to the sleeve of contact 32 as indicated, and extends to an insulated lead-through terminal 40 provided in the bottom of the case. Contact 32 is held in adjusted attitude by a compression member such as a spring washer 32w that is compressed between the head of the contact screw and cover 22b. Screws 33 and 34 are similarly fitted with compression members or washers. The lower ends of contact 32 and screws 33 and 34 are conically pointed, and those three members are of such length that the points thereof are slightly (about 0.012 inch, for example) above the path of the contact points provided on the limbs of needle 22m, when the latter rotates in level rotation on pivot pin 22c. An exposed end of an insulated conductor 38 is electrically connected to the conductive needle 22m through the conductive pivot pin 22c and case 22g, as by being soldered to a conductive terminal 22t that is soldered to the case as indicated in FIGURE 5.

The switch 22s formed by either of the contact points and the body of the needle 22m, and contact 32 (FIGURES 4 and 5) of the proximity detector, is extremely sensitive. The magnetic field of the earth ordinarily magnetizes the iron or steel stand 10 of the meter, making the top of one polarity (N, for example) and the bottom of the other polarity. With no vehicle in the parking space 17, the housing 18, with the detector 22 therein, is adjusted to a position upon the stand 10 at which one end of the compass needle moves under contact 32 under the influence of the earth's magnetic field. At that time, physical mutual attraction of the contact and the delicately balanced needle causes the adjacent tip of the needle to rise into electrical contact with the contact 32. That condition may be determined by temporarily connecting a galvanometer and a power source, with a resistor if necessary, in series across the terminals of the detector, slowly moving the housing 18 to various positions and attitudes, and noting by deflection of the galvanometer, when contact is made. The location of the detector on stand 10 when contact is effectively made and maintained is marked, as by marking the stand at the bottoms of holes 18n and 18y with an inserted marker or tool. The housing is then moved, appropriate holes are formed in the stand at the marked locations, and housing 18 is moved back and is then secured in place. Insulated conductors such as 42, 43 and 44 are drawn in through the stand as indicated, preferably enclosed in an insulative sleeve as shown, source 20 inserted in housing 18 and secured in place, and connections to be described are made. It is found that upon arrival of a vehicle in the parking space 17, the previously present magnetic field adjacent to the meter 16 is distorted and the distorted field causes the needle 22m to swing away from its previous position and out of contact with contact 32, in one or the other direction. To obviate oscillation of the needle, screws 33 and 34 are provided. It is found that as the one end of needle swings away from contact 32, the opposite end of the needle comes into position under one or the other of screws 33 and 34 and by mutual physical attraction is drawn into contact therewith. The matter contact is of no significance electrically except in respect of preventing return of the needle into proximity to contact 32 until the vehicle leaves the parking space 17.

Adjustment of the housing as described is necessary to accommodate the proximity detector to the direction and intensity of the earth's magnetic field at the particular location of the meter, and to the distortion of the field induced by entry of a vehicle into the parking space. Once the adjustment has been effected as described, it is for all practical purposes permanent. In arriving at the best position of the housing on a meter stand in any particular locality, the switch 22 can be variously rotated to different attitudes in the upper part of chamber 18c. By means and circuitry hereinafter disclosed, the electric current required to be handled by the contacts of the detector is made to be very small, for example, a few microamperes; and thus any tendency toward sticking or welding together of the contact 32 and needle 22m that might otherwise occur is obviated. Preferably, to preserve the contacting areas of contact 32, pivot 22c, and needle 22m against deterioration, those areas are plated with stable conductive material such as a previous metal, for example, gold. Since either the N, or the S, pole of the magnetic needle 22m may be drawn into position under contact 32, depending upon the magnetization of stand 10 and the disposition of housing 18 on stand 10, for example, both ends of needle 22m are preferably so plated.

Within the casing or head of the meter 16 there is disposed a clockwork (FIGURES 6 and 7) comprising conventional well-known elements including frame plates 50 and 51 and spacing struts 52 and 53 that serve to space the plates and that are secured in place between the plates by screws such as screws 54 and 55. The conventional components of the clockwork comprise an escapement wheel 58 that is fixed with a pinion 59 on a shaft 60 the reduced ends of which shaft are rotatably and slidably supported in bearings in respective ones of plates 50 and 51. As indicated in the drawings the reduced ends of shaft 60 are such that the shaft can be axially translated so as to bring pinion 59 into, or out of, engagement with a driving gear 63. Gear 63 is affixed with pinion 64 on a shaft 65 that is journaled in plates 50 and 51 and which pinion is driven by other conventional gearing (not shown) comprised in the gear train driven by the spring motor of the meter.

Escapement wheel 58 drives the conventional escapement mechanism of the clockwork through intermittent driving engagement with stones 67p of a pallet fork 67 that drives an oscillatory balance wheel. The escapement is driven by power transmitted through the gear train, in known manner. An electromagnet that may be in the form of a solenoid 69, is affixed as by screws 69s to the inside face of plate 50. The electromagnet is constructed and arranged to attract, when energized, an armature 69a in the form of a magnetic disc that is affixed to shaft 60 but which is normally forced away from the coil of the magnet by a light spider spring 70 that is disposed on shaft 60 between armature 69a and the solenoid coil. As is evident, when the coil of the magnet is not energized, spring 70 forces shaft 60 to the left as depicted and to the position indicated in FIGURE 6, thus bringing pinion 59 into mesh with gear 63. Also, upon energization of the coil of the magnet, shaft 60 is drawn to the position in which it is depicted in FIGURE 7, whereby pinion 59 is drawn out of mesh with gear 63 to permit the latter to rotate relatively freely and rapidly. Thus if and when the magnet is energized, the escapement of the clockwork is disconnected from the gear train and gears of the gear train may rotate rapidly and permit the spring motor to quickly unwind.

The meter also comprises a time-indicator shaft to which a conventional indicator needle or pointer 16p (FIGURE 1) is secured, and which shaft is rotated a selected fraction of one revolution when the meter is initially operated when a coin deposit is made. Conventionally, the time-indicator shaft is provided with spring return means or is positively driven back to initial position through connection to the spring motor, and is employed to drive, through gearing or cam means, a time-expiration flag or indicator, as is well understood in the art.

According to the invention, circuit-controlling switch means are provided which are arranged to be in open-circuit condition except when unexpired time is indicated by the meter. To that end a cam-actuated switch 78 (FIGURES 7 and 8), preferably of the snap-action or "micro" type, is mounted on the clockwork frame (as illustrated, on plate 51) in a position to be operated by a cam 79 that is affixed to shaft 80 that is journaled in bearings in plates 50 and 51. Shaft 80 may be either the aforementioned time-indicator shaft, or the time-expiration flag shaft; and as is evident cam 79 is shaped and positioned to operate the plunger of switch 78 only as the time-indicator shaft arrives at or departs from the "zero time" or neutral position of the indicator. Switch 78 may be of the type having "normally-open" terminals and "normally-closed" terminals; and thus the cam 79 will be appropriately formed and positioned, according to the terminals employed, to appropriately depress the plunger (or to permit the plunger to move out) as the time-indicator moves to or away from the zero position, whereby the circuit in which the switch is incorporated is opened as the indicator moves to or arrives at the zero position, and whereby that circuit is closed as the indicator moves away from the zero position.

The aforedescribed switches 22s and 78, the controlling means including electromagnet 69, the power source 20, a solid-state relay in the form of a silicon controlled rectifier SCR, and other and auxiliary means including conductors 38, 42, 43, 44 and 45 are electrically connected as indicated in FIGURE 8. As therein indicated, one terminal of the coil of the resetting control means electromagnet 69 is connected by way of conductor 42 to one terminal (32) of switch 22s of the detector, and is also connected by way of conductor 41 to one pole of cam-actuated switch 78 (see also FIGURE 7). The other terminal of the coil of the magnet is connected by means of conductor 43 to an appropriate terminal of the silicon controlled rectifier SCR that is used to provide relay-action as will be presently explained. The trigger terminal of the solid-state switch or rectifier SCR is connected by means of conductor 38 to the second pole (22t) of the detector switch 22s; and the other (third) terminal of the controlled rectifier is connected by means of a conductor 45 to the negative pole of power source 20. The positive pole of the power source is connected by means of a conductor 44 to the other terminal or pole of cam-actuated switch 78. As is indicated in FIGURES 2 and 7, the insulated conductors 42, 43 and 44 may be enclosed in a protective sheath Sh whereby installation is facilitated and liability of damage during installation is reduced.

With the parking space 17 vacated and the meter in off condition, and indicating zero time remaining, cam 79 is positioned to leave the circuit through switch 78 open (as indicated in FIGURE 8), and proximity switch 22 is closed. Thus, as is evident from FIGURE 8, no current is supplied by power source 20 and hence power is not wasted irrespective of how long the parking space remains vacant. As a vehicle enters the parking space, needle 22m swings away from contact 32, and thus the proximity detector circuit is opened. Thereafter, operation of the meter by coin-insertion and/or rotation of the setting knob or similar means causes rotation of shaft 80 and cam 79 so that the circuit through switch 78 is closed. The SCR unit acts then as a solid-state rectifier or solid state relay, with a negligible electron drift or current flow through the coil of magnet 69. As the vehicle is removed from space 17, needle 22m is returned into contact with contact 32 by return of the earth's magnetic field thereadjacent to normal configuration; and if that occurs prior to expiration of the registered time (prior to return of the indicator to zero), the SCR will be triggered or activated and will conduct current sufficient to operate magnet 69 and armature 69a and thus permit rapid return of the indicator to zero; that is, rapid resetting of the meter.

Thus it is seen that the proximity detector, utilizing delicate contact points at the ends of a tilting and pivotally supported magnetic needle, so arranged that the effective contact is made by a combination of rotation and tilting of the needle, is indeed a sensitive yet rugged switch device responsive to changes in the configuration of the earth's magnetic field thereat; and that by use with such a sensitive switch of a solid state relay means the triggering or activation of which is controlled by the proximity detector, only extremely small action-initiating currents are required. Further, due to use of an auxiliary switch operated by the meter mechanism, the system is alerted for action only during periods when the parking meter has been set; and that during active waiting periods during which a vehicle is in the parking space, current drain on the power source is extremely low, the energizable means comprising the solenoid coil being supplied with appreciable power only during the very short period of time required for the meter reset while the gear train is opened during rapid resetting. Further it is seen that due to the smallness and unique nature of the proximity detector and the nature of the electrical circuitry, all of the electrical apparatus including the power supply can readily be located at and supported by the meter stand, and is effective to operate satisfactorily and reliably without attention over very long periods of time. Also evident is the fact that the system is simple and inexpensive. In the interest of brevity and with the preceding description and explanation in view, certain substantially self-explanatory terms are set out in the claims hereof without detailed definitions of the terms being added to the specification; and hence the obvious definitions of those terms are incorporated into this specification by reference.

In some instances it is found to be desirable to slow or dampen the rotary movement of the field-sensitive switch blade 22m. It is evident that that result can be accomplished by increasing the moment of inertia of the rotary member, as by adding masses to the limbs of the blade, as indicated by the dotted lines in FIGURE 5. Obviously also, a circular card or like member could be used. In either case the additional device or devices is preferably attached to the blade by adhesive means.

The preceding description and explanation of a preferred exemplary embodiment of the concept of the invention as applied to a typical parking meter makes evident the attainment of the aforementioned objects. In the light of the present disclosure various changes and modifications within the true spirit and scope of the invention will occur to others, and accordingly it is not desired that the scope of the invention be restricted to the details of the illustrative embodiment but rather that it be restricted only in accord with the appended claims.

I claim:

1. A proximity detector for detecting presence of a machine or the like in a space adjacent thereto, said proximity detector comprising:

support means, including an upstanding stationary pivot means providing a sharp-pointed conductive upper tip; electric contact means including at least one stationary insulated contact, spaced radially from said pivot means; and elongate pivoted means supported at the balance point thereof for rotary pivotal movements and tilting movements on said upper tip, said pivoted means comprising an elongate permanently-magnetized member disposed with the magnetic poles at opposite sides of said balance point and said pivoted means comprising electrically conductive means electrically connecting a contact point thereon in contact with said conductive upper tip and a contact point thereon radially spaced from said pivot means a distance equal to the radial spacing of said stationary contact whereby to permit engagement therewith, said detector being adapted to be disposed to utilize the magnetic field of the earth to rotate said pivoted means to bring said contact point adjacent to said stationary contact and said stationary contact being disposed closely adjacent to the plane of rotation of said contact point to utilize the physical attraction therebetween to tilt said pivoted means to bring the contact point into electrical contact with said stationary contact.

2. A proximity detecting system adapted to provide first and second electrical indications representing absence, and presence, respectively, of a large metallic mass in a space adjacent thereto, said system comprising:

first means, including supporting structure having an upstanding pointed pivot pin, and a balanced magnetic needle device supported for rotary and tilting movements on said pin, and an electric contact supported by said supporting structure in a position removed from close proximity to either end of said needle when the needle is influenced by the undisturbed earth's magnetic field thereat but in close proximity to a path of rotation of said needle on said pin; and second means, including electric power means and conductor means including conductors connected respectively to said contact and said pin whereby said needle and said contact form elements of an electric switch; and third means, including an indicating device energizable by power from said electric power means, connected to be de-energized incident to lack of electrical contact between said needle device and said contact and to become energized incident to establishment of such electrical contact, whereby incident to absence of a large metallic mass in a space adjacent to said needle device the needle device becomes aligned with the ambient undisturbed magnetic field of the earth and incident to arrival of a large metallic mass in such space the needle device rotates into alignment with the distorted ambient magnetic field of the earth and tilts into electrical contact with said contact to cause energization of said indicating device.

3. In a proximity detecting system adapted for detection of entrance of a large metallic mass into a prescribed space, the combination comprising:

first means, including supporting means closely adjacent said space and disposed to intercept lines of force of the magnetic field of the earth adjacent said space, said supporting means including an upstanding sharp-pointed pivot support for an elongate magnetic device;

second means, including an elongate magnetic device pivotally supported by said pivot support for rotary and tilting movements thereon, said magnetic device arranged to move into alignment with the earth's magnetic field thereat and having a conductive element carried thereon;

third means, including a stationary electric contact arranged to be attracted by and contacted by said conductive element incident to rotation of said magnetic device into close proximity thereto due to change of the earth's magnetic field thereat incident to entry of such large metallic mass into such prescribed space; and fourth means, including electric circuit and power means, connected to said electrical contact and to said conductive element and arranged for circuit change incident to change of said element relative to said electrical contact upon entry of such metallic mass into said space.

4. A proximity detector adapted to utilize the earth's magnetic field and to detect presence and absence of a magnetically active mass in a space adjacent thereto, said detector comprising:

first means, including a pivotally supported structure comprising an elongate magnet and upstanding sharp-pointed pivot means supporting said structure for tilting movements thereon and for rotation of said magnet into and out of general alignment with the magnetic field of the earth thereat, said structure comprising a first electrical contact movable therewith into and out of contacting position;

contact means, including a second electrical contact disposed for electrical engagement by said first electrical contact incident to rotation of said structure incident to change of direction of the magnetic field of the earth thereat caused by change of position of a large field-distorting mass relative to said space coincident with tilting of said structure incident to physical attraction of said first electrical contact by said second electrical contact; and third means, including electric conductor means and electric power means, connected to said first and second electrical contacts and effective to provide different indications representing, respectively, presence and absence of such mass at said space.

References Cited by the Examiner

UNITED STATES PATENTS

| | | | |
|---|---|---|---|
| 2,095,114 | 10/1937 | Wood et al. | 58—142 |
| 2,255,187 | 9/1941 | Reasoner | 200—87 |
| 2,538,174 | 1/1951 | Taylor | 200—87 |
| 2,575,650 | 11/1951 | Alexander | 200—87 |
| 2,681,960 | 6/1954 | Ellison | 200—87 |
| 3,011,036 | 11/1961 | La Rocca | 200—87 |
| 3,018,615 | 1/1962 | Minton et al. | 58—142 |
| 3,022,398 | 2/1962 | Abel | 200—87 |

BERNARD A. GILHEANY, *Primary Examiner.*

LEO SMILOW, *Examiner.*

G. F. BAKER, BENJAMIN DOBECK,
*Assistant Examiners.*